(12) United States Patent
McComb

(10) Patent No.: US 9,995,152 B2
(45) Date of Patent: Jun. 12, 2018

(54) HOLLOW FAN BLADE WITH EXTENDED WING SHEATH

(71) Applicant: UNITED TECHNOLOGIES CORPORATION, Farmington, CT (US)

(72) Inventor: Patrick James McComb, Naugatuck, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 279 days.

(21) Appl. No.: 14/770,633

(22) PCT Filed: Dec. 16, 2013

(86) PCT No.: PCT/US2013/075319
§ 371 (c)(1),
(2) Date: Aug. 26, 2015

(87) PCT Pub. No.: WO2014/149098
PCT Pub. Date: Sep. 25, 2014

(65) Prior Publication Data
US 2016/0003061 A1 Jan. 7, 2016

Related U.S. Application Data

(60) Provisional application No. 61/912,849, filed on Dec. 6, 2013, provisional application No. 61/789,826, filed on Mar. 15, 2013.

(51) Int. Cl.
*F01D 5/02* (2006.01)
*F01D 5/28* (2006.01)
(Continued)

(52) U.S. Cl.
CPC ............... *F01D 5/282* (2013.01); *F01D 5/02* (2013.01); *F01D 5/147* (2013.01); *F01D 5/18* (2013.01);
(Continued)

(58) Field of Classification Search
CPC . F01D 5/282; F01D 5/02; F01D 5/147; F01D 5/18; F02C 3/04; F05D 29/324;
(Continued)

(56) References Cited

U.S. PATENT DOCUMENTS 5,129,787 A 7/1992 Violette et al.
5,720,597 A * 2/1998 Wang ...................... F01D 5/147
416/229 A (Continued)

FOREIGN PATENT DOCUMENTS

EP 0496550 A1 7/1992
EP 2540874 A2 1/2013
EP 2540974 A2 1/2013

OTHER PUBLICATIONS

Supplementary European Search Report for EP Application No. EP 13 87 9066.

(Continued)

*Primary Examiner* — Steven Sutherland
(74) *Attorney, Agent, or Firm* — Cantor Colburn LLP

(57) ABSTRACT

A fan blade for a turbomachinery fan and methods for fabricating a fan blade for a turbomachinery fan are disclosed. The fan blade for a turbomachinery fan includes an airfoil having a leading edge and a trailing edge in a chordwise direction, a tip and a root in a spanwise direction, a suction side and a pressure side. The fan blade includes a sheath including a solid portion that covers the leading edge of the airfoil, a first wing attached to the suction side of the airfoil, and a second wing attached to the pressure side of the (Continued)

airfoil. Construction of the fan blade includes one or more hollow cavities between the suction side and the pressure side of the airfoil.

14 Claims, 4 Drawing Sheets

(51) Int. Cl.
    *F01D 5/14*     (2006.01)
    *F04D 29/32*     (2006.01)
    *F01D 5/18*     (2006.01)
    *F02C 3/04*     (2006.01)

(52) U.S. Cl.
    CPC .............. *F02C 3/04* (2013.01); *F04D 29/324* (2013.01); *F05D 2220/32* (2013.01); *F05D 2220/36* (2013.01); *F05D 2230/10* (2013.01); *F05D 2230/23* (2013.01); *F05D 2230/60* (2013.01); *F05D 2240/303* (2013.01); *F05D 2300/121* (2013.01); *F05D 2300/133* (2013.01); *Y02T 50/672* (2013.01); *Y02T 50/673* (2013.01)

(58) Field of Classification Search
    CPC ............. F05D 2220/32; F05D 2220/36; F05D 2230/10; F05D 2230/23; F05D 2230/60; F05D 2240/303; F05D 2300/121; F05D 2300/133

See application file for complete search history.

(56) References Cited

U.S. PATENT DOCUMENTS

| | | | |
|---|---|---|---|
| 6,524,074 B2* | 2/2003 | Farrar | F01D 5/28 416/229 A |
| 7,101,154 B2* | 9/2006 | Dambrine | B29C 70/48 29/889.71 |
| 2011/0211695 A1 | 9/2011 | Dear et al. | |
| 2011/0211965 A1* | 9/2011 | Deal | F01D 5/147 416/223 R |
| 2012/0301292 A1 | 11/2012 | Deal et al. | |
| 2013/0004324 A1 | 1/2013 | Hansen et al. | |

OTHER PUBLICATIONS

International Search Report Application No. PCT/US2013/075319, dated Sep. 23, 2014.

* cited by examiner

HOLLOW FAN BLADE WITH EXTENDED WING SHEATH

CROSS-REFERENCE TO RELATED PATENT APPLICATIONS

This patent application is a U.S. National Stage under 35 U.S.C. § 371, claiming priority to International Application No. PCT/US2013/075319 filed on Dec. 16, 2013, which claims priority under 35 U.S.C. § 119(e) to U.S. Patent Application Ser. Nos. 61/912,849 filed on Dec. 6, 2013 and 61/789,826 filed on Mar. 15, 2013.

TECHNICAL FIELD OF THE DISCLOSURE

The present disclosure relates to the design of gas turbine engines and, more particularly, to the design of fan blade components of gas turbine engines.

BACKGROUND OF THE DISCLOSURE

A gas turbine engine, per FAA regulations, should be capable of ingesting foreign objects (e.g., birds in flight) while allowing for continued operation, or safe and orderly shutdown of the engine. Further, blades in the gas turbine engine should be resistant to cracking due to nicks and/or dents caused by small debris such as sand and/or rain. To prevent damage on account of such small debris and foreign object ingestion, specifically, materials such as titanium alloys and fiber composites are typically used to construct the fan and/or compressor blades in gas turbine engines. Gas turbine engines with titanium fan blades, as well as certain reinforced fiber composite fan blades with adhesively bonded metallic leading edge sheaths, are commonly used to meet such damage-prevention criteria.

While titanium blades may be relatively strong, they also may be relatively heavy and expensive to manufacture. Further, composite blades may offer sufficient strength and be significantly lighter than titanium blades; however, composite blades are expensive to manufacture. Also, due to their relatively low strain tolerance, composite blades may require a greater thickness than otherwise equivalent metal blades to meet requirements for ingestion of foreign objects. Increases in fan blade thickness may be accompanied by decreases in fan efficiency. This decrease in efficiency may offset a portion of the efficiency gains from the decrease in weight achieved by using a composite blade.

As another alternative, fan and/or compressor blades made from aluminum or aluminum alloy may result in significant decreases in weight over titanium blades and may be less expensive to manufacture than composite blades. However, aluminum and/or aluminum alloy blades may be softer and lower in strength than titanium and/or composite blades. Aluminum blades may also be susceptible to erosion and corrosion, and therefore require coatings. In some designs, a leading edge sheath made of titanium and/or nickel can give the aluminum blade added protection without significantly increasing the weight.

While each is effective in certain aspects, modern engine design often requires larger and larger blades. The foregoing weight, strength, and foreign object resistance issues are only exasperated in such larger blades. Accordingly, it can be seen that further improvements in blade design are needed.

SUMMARY OF THE DISCLOSURE

In accordance with one aspect of the disclosure, a gas turbine engine fan blade is disclosed. The fan blade may include an airfoil having a leading edge and a trailing edge in a chordwise direction, a tip and a root in a spanwise direction, and a suction side and a pressure side. The fan blade may include a sheath comprising a solid portion that covers the leading edge of the airfoil and a blade body between the suction side and the pressure side of the airfoil, wherein the blade body defines a cavity.

In a refinement, the cavity may be filled with a material having a lighter density than the airfoil.

In a further refinement, the material having a lighter density than the airfoil may be a hybrid metallic substance.

In a refinement, the airfoil may be constructed from aluminum.

In a further refinement, the cavity may be filled with a hybrid metallic substance having a lower density than aluminum.

In a refinement, the sheath may extend over at least about 35% of the airfoil in a chordwise direction.

In a further refinement, the sheath may extend over at least about 35% of the airfoil in a chordwise direction in a region of the airfoil near the tip of the airfoil.

In a refinement, the cavity may be located underneath the portion of the airfoil covered by the sheath.

In a refinement, the sheath may be titanium.

In a refinement, the sheath may further include a first wing attached to the suction side of the airfoil and a second wing attached to the pressure side of the airfoil.

In a refinement, the sheath may be secured to the airfoil by bonding.

In accordance with another aspect of the disclosure, a method of fabricating a gas turbine engine blade is disclosed. The turbomachinery blade may have an airfoil having a leading edge and a trailing edge in a chordwise direction, a tip and a root in a spanwise direction, a suction side, a pressure side, and a blade body between the suction side and the pressure side. The method may include forming a sheath over the airfoil, the sheath having a solid portion that covers the leading edge of the airfoil. The method may include forming one or more hollow cavities between the suction side and the pressure side of the airfoil and forming a cavity within the blade body.

In a refinement, the method may further include filling the cavity with a material having a lighter density than the airfoil.

In a refinement, the method may further include filling the cavity with a hybrid metallic substance In a refinement, the method may further include constructing the aifoil from aluminum.

In a further refinement, the method may further include forming the sheath with a wing, wherein the wing is tapered.

In a refinement, the method may further include locating the cavity underneath the portion of the airfoil covered by the sheath.

In accordance with another aspect of the disclosure, a gas turbine engine is disclosed. The gas turbine engine may include a fan, the fan having at least one fan blade, the at least one fan including an airfoil having a leading edge and a trailing edge in a chordwise direction, a tip and a root in a spanwise direction, a suction side and a pressure side, a sheath including a solid portion that covers the leading edge of the airfoil, and a blade body between the suction side and the pressure side of the airfoil, wherein the blade body defines a cavity. The gas turbine engine may include a compressor section downstream of the fan, a combustor section downstream of the compressor section, and a turbine section downstream of the combustor section.

These and other aspects and features of the present disclosure will be more readily apparent when taken in conjunction with the accompanying drawings.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE DRAWINGS

Figure 1:
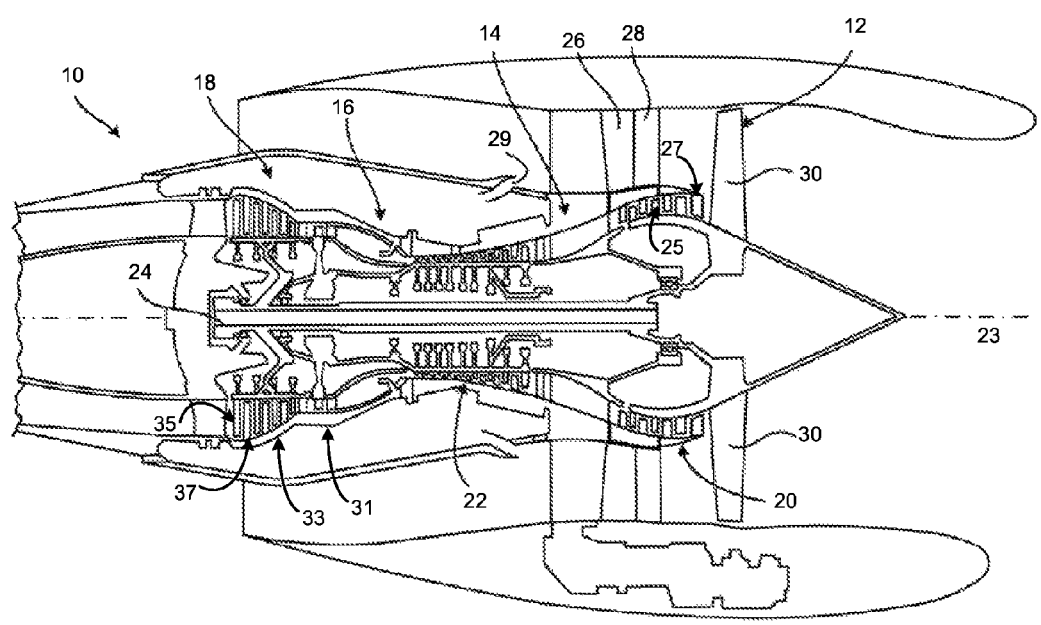
FIG. 1 is a cross sectional view of a gas turbine engine constructed in accordance with the present disclosure and constructed in accordance with the present disclosure.

Referring to the drawings, and with specific reference to FIG. 1, a gas turbine engine constructed in accordance with the present disclosure is generally referred to by reference numeral 10. Such a gas turbine engine can be used for any number of different applications including, but not limited to, generation of aircraft thrust and land-based power. Moreover, it is to be understood that the sectional view provided in FIG. 1 is included simply to provide a basic understanding of the various components in a gas turbine engine, and not to limit the invention thereto. The present disclosure extends to all types of gas turbine engines used in all types of applications.

The gas turbine engine 10 may include a fan 12, a compressor section 14, a combustor section 16, and a turbine section 18 aligned in linear fashion through the engine 10. The compressor section 14 may include a low-pressure compressor 20 and a high-pressure compressor 22. Air is taken in through fan 12 as fan 12 spins about an axis 23. A portion of inlet air may be directed to the compressor section 14 where it may be compressed by a series of rotating blades 25 and fixed vanes 27. The compressed air may be mixed with fuel and ignited in the combustor section 16. Combustion exhaust generated in the combustor section 16 may be directed to the turbine section 18. The turbine section 18 may include high pressure turbine 31 and low pressure turbine 33 spinning together concentric to the axis 23. Similar to the compressor section 14, the turbine section 18 contains a series of turbine blades 35 and turbine vanes 37 which may extract kinetic energy from the combustion exhaust. The kinetic energy may be used to turn a shaft 24 and provide power output for the gas turbine engine 10.

In one example, the gas turbine engine 10 may be a high-bypass geared aircraft engine. In a further example, the gas turbine engine 10 may have a bypass ratio greater than about six (6:1) although other ratios are possible. "Bypass ratio" is a term of art comparing the volume of air coming through the fan and passing around the compressor relative to the volume of air passing through the compressor. The geared architecture may include an epicyclic gear train, such as a planetary gear system or other gear system. An example epicyclic gear train may have a gear reduction ratio of greater than about 2.3:1, and in another example may be greater than about 2.5:1, although other ratios are possible. The geared turbofan may enable operation of low spool at higher speeds which may increase the operational efficiency of the low pressure compressor 20 and low pressure turbine 33 and may render increased pressure in a fewer number of stages.

A pressure ratio associated with the low pressure turbine may be pressure measured prior to the inlet of the low pressure turbine as related to the pressure at the outlet of the low pressure turbine prior to an exhaust nozzle of the gas turbine engine 10. In one embodiment, the bypass ratio of the gas turbine engine 10 may be greater than about ten (10:1), the fan diameter is significantly larger than that of the low pressure compressor 20, and the low pressure turbine has a pressure ratio that is greater than about five (5:1). It should be understood, however, that the above parameters are only exemplary of one embodiment of a geared architecture engine and that the present disclosure is applicable to other gas turbine engines.

In an example embodiment, a significant amount of thrust may be provided by the bypass flow path due to the high bypass ratio. The fan 12 if the gas turbine engine 10 may be designed for a particular flight condition—typically cruise at about 0.8 Mach and about 35,000 feet. This flight condition, with the gas turbine engine 10 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of a fan section without the use of a Fan Exit Guide Vane system. The low Fan Pressure Ratio according to one embodiment of the example gas turbine engine 10 is less than 1.45. Low Corrected Fan Tip Speed is the actual fan tip speed divided by an industry standard temperature correction of $(T/518.7)^{0/5}$, in which "T" represents the ambient temperature in degrees Rankine The Low Corrected Fan Tip Speed according to one embodiment of the example gas turbine engine 10 is less than about 1150 fps (350 m/s) although other values are possible.

Bypass air is the portion of inlet air which is taken in through the fan 12 and not directed through compressor section 14. The bypass air may be directed through a bypass duct 26 by guide vanes 28. Some of the bypass air may flow through an opening 29 to cool the combustor section 16, the high pressure compressor 22, and/or the turbine section 18. Fan 12 may include a plurality of blades 30 which spin as part of the fan 12 about the axis 23.

Figure 2:
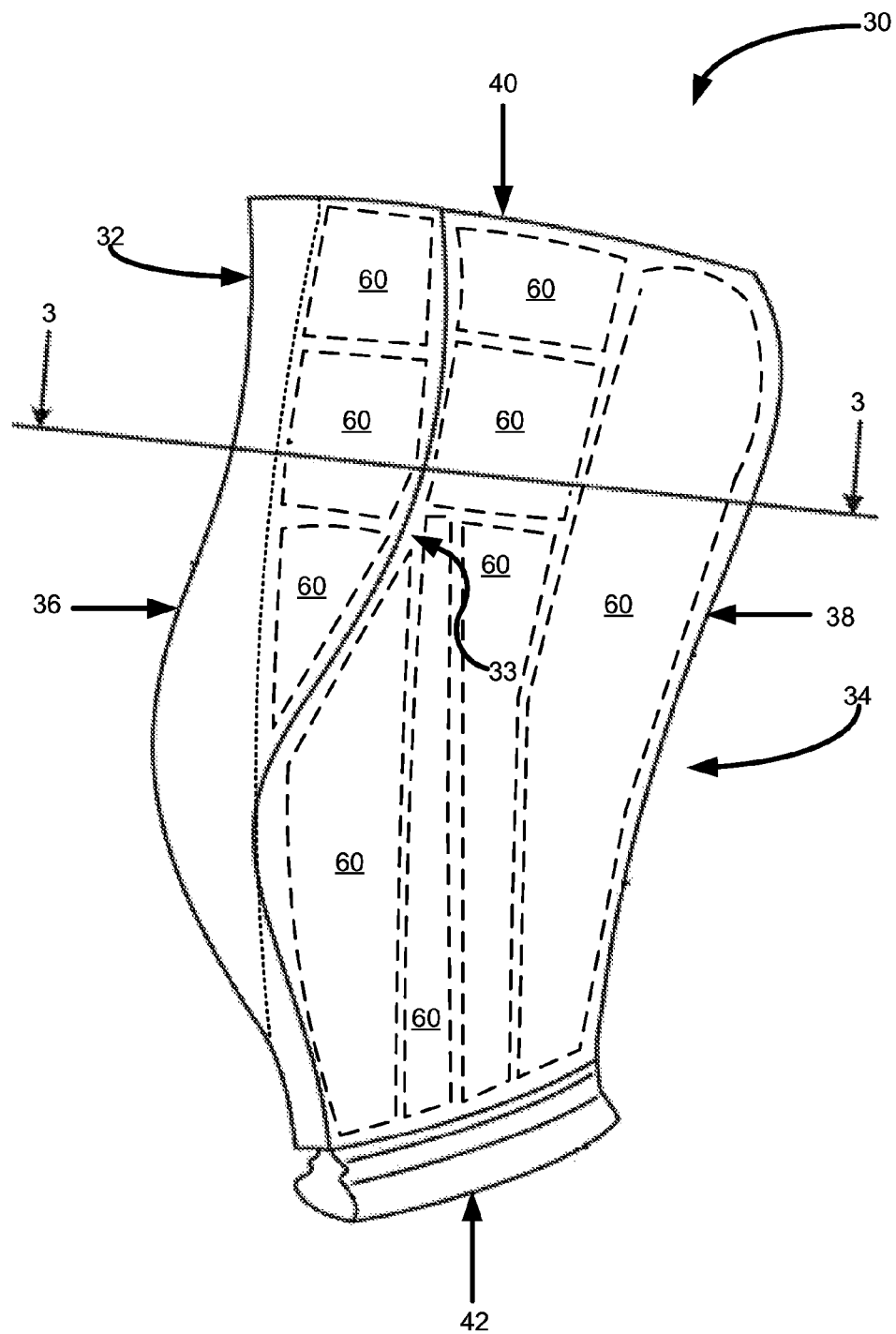
FIG. 2 is a perspective view of a fan blade having a sheath and hollow cavities, and constructed in accordance with the present disclosure.
Figure 3:
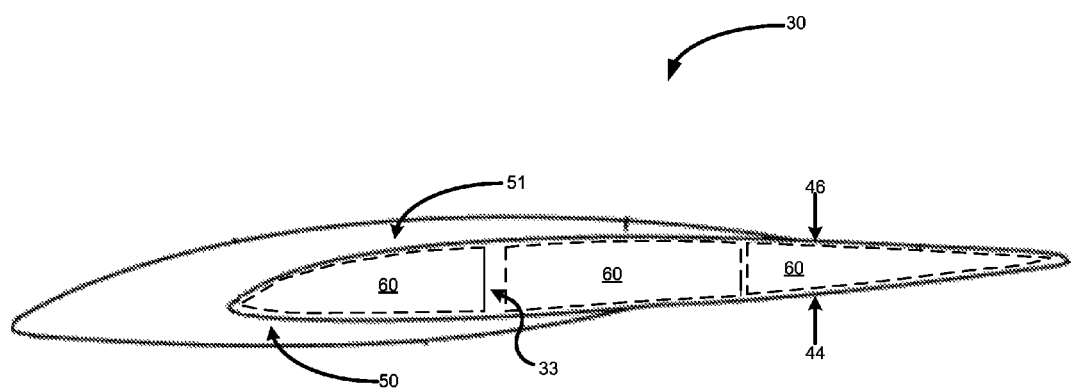
FIG. 3 is a cross-sectional view of the fan blade having a sheath and hollow cavities of FIG. 2, taken along line 3-3 of FIG. 2.
Figure 4:
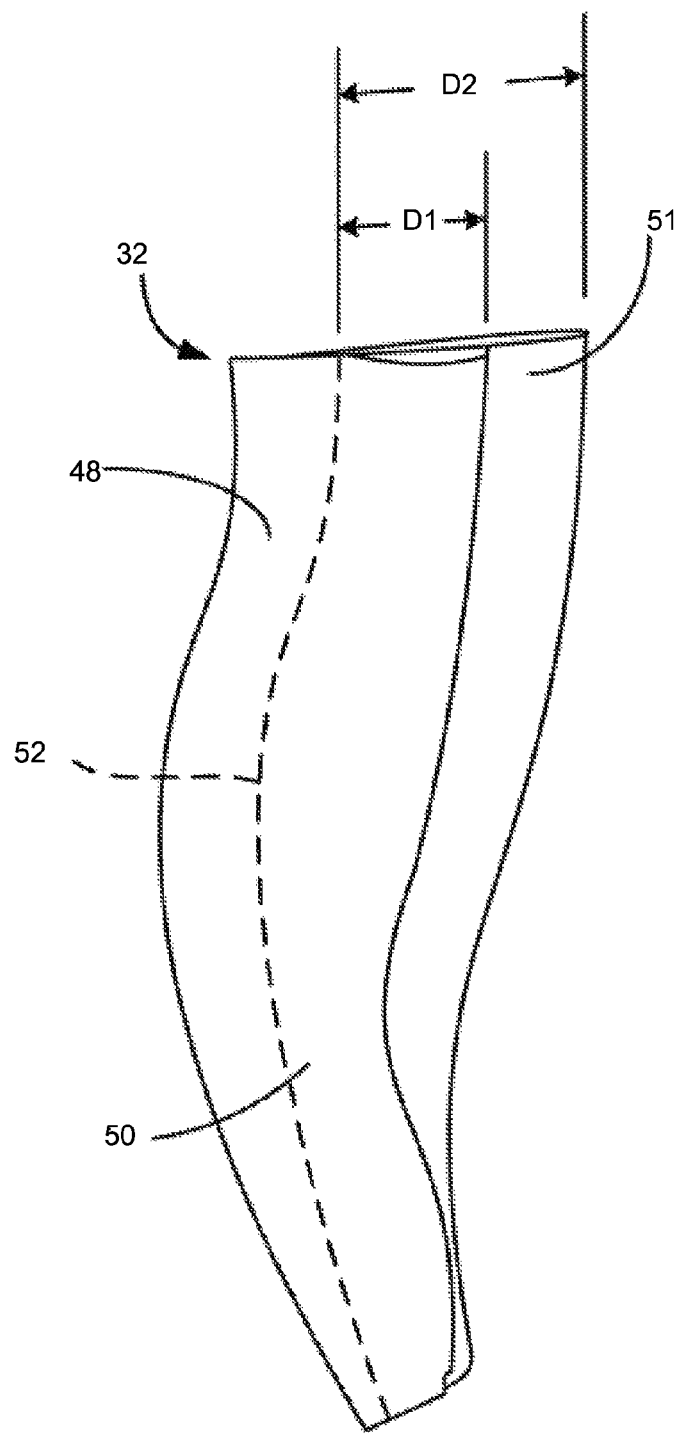
FIG. 4 is a plan view of the sheath of the fan blade of FIGS. 2 and/or 3.

The in-line components of the gas turbine engine 10 may be susceptible to damage from foreign objects (e.g., ingestion of birds) and, thus, the blade(s) 30 may be designed to prevent foreign object damage by, for example, adding a sheath to the blade 30. However, in the design of such foreign object resistant blades, excess weight may be added to the blade causing a loss in operational efficiency of the gas turbine engine 10. FIGS. 2-4 illustrate a blade 30 having a sheath to prevent such foreign object damage while also having hollow cavities to lessen the weight of the blade relative to a solid blade of the same material. The decrease in weight due to hollow cavities may increase the operational efficiency of the gas turbine engine 10.

Turning to the drawings, FIG. 2 illustrates a perspective view of an example blade 30 having a sheath 32. Blade 30 may include an airfoil 34 with a leading edge 36 and a trailing edge 38 in a chordwise direction, a tip 40 and a root 42 in a spanwise direction. Beneath the airfoil 34, the blade 30 may include a blade body 33. In some examples, the blade body may be constructed to define one or more cavities 60. As seen in FIG. 3, the blade 30 may include a suction side 44 and pressure side 46 in a thickness direction. The blade body 33 may be defined in a thickness direction between the suction side 44 and the pressure side 46 of the airfoil 34. Thusly, the cavities 60 may be constructed in a thickness direction and cavities may be designed to make the blade 30 have a lighter weight relative to a blade having a solid blade body. The one or more cavities 60 may include any number of cavities in any arrangement thereof suitable for design of the blade 30. In some examples, blade 30, and any components thereof, may be made from aluminum and/or aluminum alloys, although other materials are possible.

FIG. 4 illustrates a perspective view of the sheath 32 of FIGS. 2 and/or 3. The sheath 32 may include a solid portion 48 covering the leading edge 36 of FIG. 2. Further, the sheath 32 may include a first wing 50 extending from the solid portion 48 over the suction side 44 of FIG. 3 in a chordwise direction. The sheath 32 also may include a second wing 51 extending from the solid portion 48 over the pressure side 46 of FIG. 3 in a chordwise direction. The first wing 50 and/or the second wing 51 may be tapered.

The sheath 32 may be formed as a single piece or may be formed from more than one piece. If formed from more than one piece, pieces of the sheath 32 may be secured together (e.g., by welding, bonding, etc.) into one piece before bonding the sheath 32 on to the airfoil 34. A sheath 32 secured into one piece may provide greater strength and therefore greater protection for the airfoil 34. The sheath 32 may be made of titanium and/or titanium alloys or another material with similar strength-to-weight ratios and/or other characteristics which would make it ideal to use in protecting airfoil 34 from an impact loading, such as those caused by foreign objects (e.g., a bird strike). Additionally or alternatively, sheath 32 may be made of stainless steel and/or stainless steel alloys, nickel and/or nickel alloys, and/or other materials.

In some examples, the sheath 32 may cover leading edge 36 of the airfoil 34 with solid portion 48 by bonding wings 50, 51 to suction side 44 and pressure side 46 of airfoil 34. Wings 50 can be bonded to suction side 44 and pressure side 46 with various adhesives including, but not limited to, rubber, silicone or epoxy resin. The solid portion 48 of sheath 32 may vary in thickness.

The distance which the solid portion 48 of sheath 32 extends out from leading edge 36 (see FIG. 3) can vary across the span (from root 42 to tip 40) of sheath 32, and may be about 28.70 mm (1.13 inches) in the area of airfoil 34 nearest to tip 40, and about 80-100% of the span of airfoil 34. In some examples, the first wing 50 can extend over about 35% of the airfoil 34 in the chordwise direction at tip 40, covering about 30% of suction side 44 in the area nearest to the tip 40. The second wing 51 can extend over about 45% of the airfoil 34 in the chordwise direction, covering about 35% of the pressure side 46 of the airfoil 34 in the area nearest to the tip 40. By ensuring first wing 50 and second wing 51 extend at least about 30% of the airfoil chord or cover a particular amount of area on the suction side 44 and/or pressure sides 46, the sheath 32 provides extra strength and stiffness to blade 30, allowing blade 30 to be made of lightweight materials (e.g., aluminum), and maintain its original shape and therefore optimal performance and levels of aerodynamic efficiency even under impact loading.

For example, in FIGS. 2-4, the first wing 50 extends over the distance D1 (for example, about 88.9 mm from the leading edge 36 on the suction side 44) and the second wing 51 extends a distance D2 (for example, about 114.3 mm from the leading edge 36 on the pressure side 46). The thickness of each of wings 50 and 51 can vary depending on the solid portion 48 of the sheath 32, but can, for example, be about 0.838 mm. The lengths and percentages for the dimensions of sheath 32 are given for example purposes and can vary depending on the requirements for blade 30, sheath 32 and engine 12. For example, sheath wings 50 and 51 could extend over nearly all of the suction side 44 and/or pressure side 46 of the airfoil 34 in some embodiments.

By extending first wing 50 and second wing 51, sheath 32 is able to better protect airfoil 34. Additionally, wings 50 and 51 further provide extra stiffness to airfoil 48 and more surface area for a smooth load transfer during impacts to blade 30. Wings 50 and 51 can also be tapered to help to reduce stress discontinuities, therefore reducing the likelihood that wings 50 will peel away from blade 30.

However, when the sheath 32 extends over substantial portions of the blade airfoil chord, but for the further inventive contributions of the present disclosure, the weight of the blade 30 may be increased significantly. To lighten the blade, one or more cavities 60 may be present within the blade body 33 underneath the airfoil 34. The cavities may be present between the suction side 44 and the pressure side 46 of the airfoil 34. The one or more cavities 60 may be located underneath the portion of the airfoil 34 covered by the sheath. Additionally or alternatively, the cavities 60 may also be located beneath any remaining portion of the airfoil 34 between the suction side 44 and the pressure side 46.

The one or more cavities 60 may be hollow. Additionally or alternatively, the one or more cavities 60 may be filled with a substance, the substance having less density than the metal from which the blade is constructed. Filling the cavities 60 with a less dense substance may achieve the result of lessening the weight of the blade 30 while also maintaining the durability of a solid blade. In some examples, the blade 30 may be constructed from aluminum; in some such examples, the one or more cavities 60 may be filled with a hybrid metallic substance having less density than the aluminum used to construct the blade 30. The hybrid metallic substance may be any combination of a metallic (e.g. titanium, aluminum, nickel, etc.) and other substances such as, but not limited to, metallic foams, metallic or polymeric honeycombs, polymer matrix composites, organic matrix composites, energy absorbing materials (e.g., Kevlar®, etc.), and/or structural adhesives such as polyurethanes and epoxies. In some embodiments, the blade 30 may be of a size that necessitates using one or more cavities 60, hollow or filled, to allow the blade to weigh less.

From the foregoing it can be seen that the present disclosure sets forth gas turbine engines and gas turbine engine blades having a protective sheath and hollow and/or alloy-filled cavities. In doing so, protection from foreign object damage is provided by the sheath while the hollow and/or alloy filled cavities allow the blade to be lighter. A lighter blade may be associated with greater efficiency in the gas turbine engine.

INDUSTRIAL APPLICABILITY

From the foregoing, it can be seen that the technology disclosed herein has industrial applicability in a variety of settings such as, but not limited to, the design and construction of fan blades for a gas turbine engine. The gas turbine engine may be used in conjunction with an aircraft for generating thrust, or for land-based applications for generating power. Using the teachings of the present disclosure, the design and construction of the fan blades for the gas turbine engine may include design improvements for foreign object damage prevention, for example, for protection from bird strikes on the fan of the aircraft. This improvement over the prior art allow the blade to have adequate protection from foreign object damage while also preserving operational efficiency by maintaining a light weight blade.

While the present disclosure has been in reference to a gas turbine engine and an aircraft, one skilled in the art will understand that the teachings herein can be used in other applications as well. For example, the disclosed systems and methods may be used for foreign object damage prevention while maintaining a lighter weight wing for other fan-based machinery. It is therefore intended that the scope of the invention not be limited by the embodiments presented herein as the best mode for carrying out the invention, but that the invention will include all equivalents falling within the spirit and scope of the claims as well.

What is claimed is:

1. A fan blade for a gas turbine engine, the fan blade comprising:
    an airfoil having a leading edge and a trailing edge in a chordwise direction, a tip and a root in a spanwise direction, a suction side and a pressure side;
    a sheath comprising a solid portion that covers the leading edge of the airfoil, wherein at least one of a first wing and a second wing of the sheath extends over at least 35% of the airfoil in a chordwise direction in a region of the airfoil near the tip of the airfoil, and wherein at least one of the first wing and the second wing are tapered; and
    a blade body between the suction side and the pressure side of the airfoil, wherein the blade body defines a cavity and wherein the cavity is located in a portion of the airfoil covered by the sheath.

2. The fan blade of claim 1, wherein the cavity is filled with a material having a lighter density than the airfoil.

3. The fan blade of claim 2, wherein the material having a lighter density than the airfoil is a hybrid metallic substance.

4. The fan blade of claim 1, wherein the airfoil is constructed from aluminum.

5. The fan blade of claim 4, wherein the cavity is filled with a hybrid metallic substance having a lower density than aluminum.

6. The fan blade of claim 1, wherein the sheath is titanium.

7. The fan blade of claim 1, wherein the first wing is attached to the suction side of the airfoil; and
    the second wing is attached to the pressure side of the airfoil.

8. The fan blade of claim 1, wherein the first wing and the second wing of the sheath are secured to the airfoil by bonding.

9. A method of fabricating a blade for a gas turbine engine, the blade having an airfoil having a leading edge and a trailing edge in a chordwise direction, a tip and a root in a spanwise direction, a suction side and a pressure side, and a blade body between the suction side and the pressure side, the method comprising:
    forming a sheath over the airfoil, the sheath having a solid portion that covers the leading edge of the airfoil, wherein at least one of a first wing and a second wing of the sheath extends over at least 35% of the airfoil in a chordwise direction in a region of the airfoil near the tip of the airfoil, and wherein at least one of the first wing and the second wing are tapered;
    forming one or more hollow cavities between the suction side and the pressure side of the airfoil; and
    wherein at least one of the one or more hollow cavities are located in a portion of the airfoil covered by the sheath.

10. The method of claim 9, further comprising filling the one or more hollow cavities with a material having a lighter density than the airfoil.

11. The method of claim 9, further comprising filling the one or more hollow cavities with a hybrid metallic substance.

12. The method of claim 9, further comprising constructing the airfoil from aluminum.

13. A gas turbine engine, comprising:
    a fan, the fan comprising at least one fan blade, the at least one fan blade comprising:
        an airfoil having a leading edge and a trailing edge in a chordwise direction, a tip and a root in a spanwise direction, a suction side and a pressure side;
        a sheath comprising a solid portion that covers the leading edge of the airfoil, wherein at least one of a first wing and a second wing of the sheath extends over at least 35% of the airfoil in a chordwise direction in a region of the airfoil near the tip of the airfoil, wherein at least one of the first wing and the second wing are tapered; and
        a blade body between the suction side and the pressure side of the airfoil, wherein the blade body defines a cavity and wherein the cavity is located in a portion of the airfoil covered by the sheath;
    a compressor section downstream of the fan;
    a combustor section downstream of the compressor section; and
    a turbine section downstream of the combustor section.

14. The gas turbine engine of claim 13, wherein the cavity is filled with a material having a lighter density than the airfoil.

* * * * *